United States Patent
Volker et al.

(10) Patent No.: US 12,449,099 B2
(45) Date of Patent: Oct. 21, 2025

(54) EXTERNAL HYDROSTATIC PRESSURE-RESISTANT PRESSURE VESSEL

(71) Applicant: Northrop Grumman Systems Corporation, Falls Church, VA (US)

(72) Inventors: Herbert B. Volker, Annapolis, MD (US); Daniel H. Vogel, Woodstock, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 53 days.

(21) Appl. No.: 18/472,697

(22) Filed: Sep. 22, 2023

(65) Prior Publication Data

US 2025/0102120 A1    Mar. 27, 2025

(51) Int. Cl.
*F17C 13/06* (2006.01)
*F16J 15/32* (2016.01)

(52) U.S. Cl.
CPC .............. *F17C 13/06* (2013.01); *F16J 15/32* (2013.01); *F17C 2203/0646* (2013.01)

(58) Field of Classification Search
CPC .................................................. H01R 12/7058
USPC ......................................... 439/376; 174/88 C
See application file for complete search history.

(56) References Cited

U.S. PATENT DOCUMENTS

| | | | | |
|---|---|---|---|---|
| 3,705,256 A | * | 12/1972 | Eftestol ................. | H02G 15/18 29/421.2 |
| 3,718,749 A | * | 2/1973 | Cunningham ......... | H02G 15/10 254/105 |
| 3,939,298 A | * | 2/1976 | Gosling ................. | H02G 15/24 174/15.6 |
| 4,099,021 A | * | 7/1978 | Venezia ................. | H02G 15/18 439/279 |
| 4,621,168 A | * | 11/1986 | Bryant ................... | H02G 15/14 174/76 |
| 2001/0046811 A1 | | 11/2001 | Fleury et al. | |
| 2003/0228783 A1 | | 12/2003 | Cairns et al. | |
| 2013/0044983 A1 | | 2/2013 | Nagengast et al. | |

FOREIGN PATENT DOCUMENTS

| | | |
|---|---|---|
| CN | 107910699 A | 4/2018 |
| CN | 109244711 A | 1/2019 |

OTHER PUBLICATIONS

PCT ISR Corresponding to PCT/US2024/042734 on Nov. 25, 2024.
PCT Opinion Corresponding to PCT/US2024/042734 on Nov. 25, 2024.

* cited by examiner

*Primary Examiner* — Phuong K Dinh
(74) *Attorney, Agent, or Firm* — Dority & Manning, P.A.

(57) ABSTRACT

A pressure vessel is provided including a housing capable of withstanding external hydrostatic pressures having an internal cavity defining a first opening permitting access to the internal cavity. A plug is disposed in a plug region near the first opening. A gland seal is disposed adjacent to the plug and a piston is disposed adjacent to the gland seal. A first and second plate connected via one or more rods are disposed adjacent to the piston. A tightening mechanism is configured to exert force against the gland seal such that expansion of the gland seal seals the first opening. A casing is disposed over an outer surface of the housing, the plug, the gland seal, and at least a portion of the piston.

20 Claims, 4 Drawing Sheets

EXTERNAL HYDROSTATIC PRESSURE-RESISTANT PRESSURE VESSEL

FIELD

The present disclosure relates generally to a pressure vessel, and more specifically to an underwater, deep-sea pressure vessel.

BACKGROUND

Pressure vessels can be used to protect electronic or other components in a subsea environment. Pressure vessels can prevent degradation caused by the high-pressure, corrosive environment. Pressure vessels can include complicated annular channels, O-rings, and plugs utilized to completely seal the internal environment of the pressure vessel. Sealing of the pressure vessels via complicated mechanics increases manufacturing time and costs. Further, materials used to form subsea pressure vessels for long term submersion must be formed from corrosion resistant materials (e.g., titanium, nickel alloys) that can further increase manufacturing costs and lead times. As such, improved pressure vessels are needed.

BRIEF DESCRIPTION

Aspects and advantages of the present disclosure will be set forth in part in the following description, or may be obvious from the description, or may be learned through practice of the present disclosure.

Aspects of the present disclosure are directed to a pressure vessel. The pressure vessel includes a housing capable of withstanding external hydrostatic pressures having an internal cavity defining a first opening permitting access to the internal cavity and a housing outer surface and a plug disposed in a plug region near the first opening, the plug having a plug circumferential surface. The pressure vessel also includes a gland seal disposed adjacent to the outer surface of the plug, the gland seal having a gland seal circumferential surface and a piston disposed adjacent to the gland seal, the piston having a piston circumferential surface. The pressure vessel includes a first plate and second plate connected via one or more rods configured to exert force against the gland seal such that expansion of the gland seal effectively seals the first opening of pressure vessel. A casing is disposed over the housing outer surface, the plug circumferential surface, the gland circumferential surface, and at least a portion of the piston circumferential surface.

These and other features, aspects, and advantages of the present disclosure will be further supported and described with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part can be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The terms "coupled," "fixed," "attached to," and the like refer to both direct coupling, fixing, or attaching, as well as indirect coupling, fixing, or attaching through one or more intermediate components or features, unless otherwise specified herein. Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the disclosed functionality, and any two components capable of being so associated can also be viewed as being "operably couplable" to each other to achieve the disclosed functionality. Some examples of operably couplable include, but are not limited to, physically mateable, physically interacting components, wirelessly interactable, wirelessly interacting components, logically interacting, and/or logically interactable components.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein will be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to a subsea pressure vessel. In some cases, the pressure vessel can include a housing capable of withstanding external hydrostatic pressures having an internal cavity. One or more openings can be disposed at the ends of the housing to permit access to an internal cavity. The housing has an outer surface. The pressure vessel also includes a plug disposed in a plug region near the first opening. The plug has a plug circumferential surface. A gland seal is disposed adjacent to the plug and includes a gland seal circumferential surface. A piston is disposed adjacent to the gland seal and includes a piston circumferential surface. A first plate is disposed adjacent to the piston and a second plate is disposed adjacent to a second end of the pressure vessel. The plates are connected via one or more rods having a tightening mechanism disposed thereon. The tightening mechanism is configured to exert force against the gland seal such that expansion of the gland seal seals the first opening of the pressure vessel. A casing is disposed over the housing outer surface, the plug circumferential surface, the gland circumferential surface, and at least a portion of the piston circumferential surface.

Notably, components of the pressure vessel as described, such as the plug and housing can be formed from other materials known to easily corrode in seawater (e.g., carbon steel, aluminum) and can be protected from the corrosive external environment by the casing. Accordingly, the pressure vessel as provided is more economical to manufacture and is effective at sealing the internal cavity from the external environment. Further, the pressure vessels described herein can be used in a variety of manners, for example to house sensors or to provide a protective environment for repairing subsea cables.

Methods for providing a sealed environment are also provided. The methods can include disposing at least a portion of one or more cables (e.g., subsea cables) into a pressure vessel as described herein. For instance, the one or more cables can be inserted into the inner cavity of a housing of the pressure vessel. The method further includes applying force against the gland seal of the pressure vessel to expand the gland seal and seal the first opening of the pressure vessel. The same gland seal configuration as disclosed can be used on multiple housing openings to seal the housing of the pressure vessel from the external environment. The disclosed methods are useful for providing environmentally sealed environments for cables and, as such, can also be utilized during installation and/or repair of subsea cables. Use of the disclosed pressure vessel can also electrically insulate components (e.g., cables) disposed within the pressure vessel.

Figure 1:
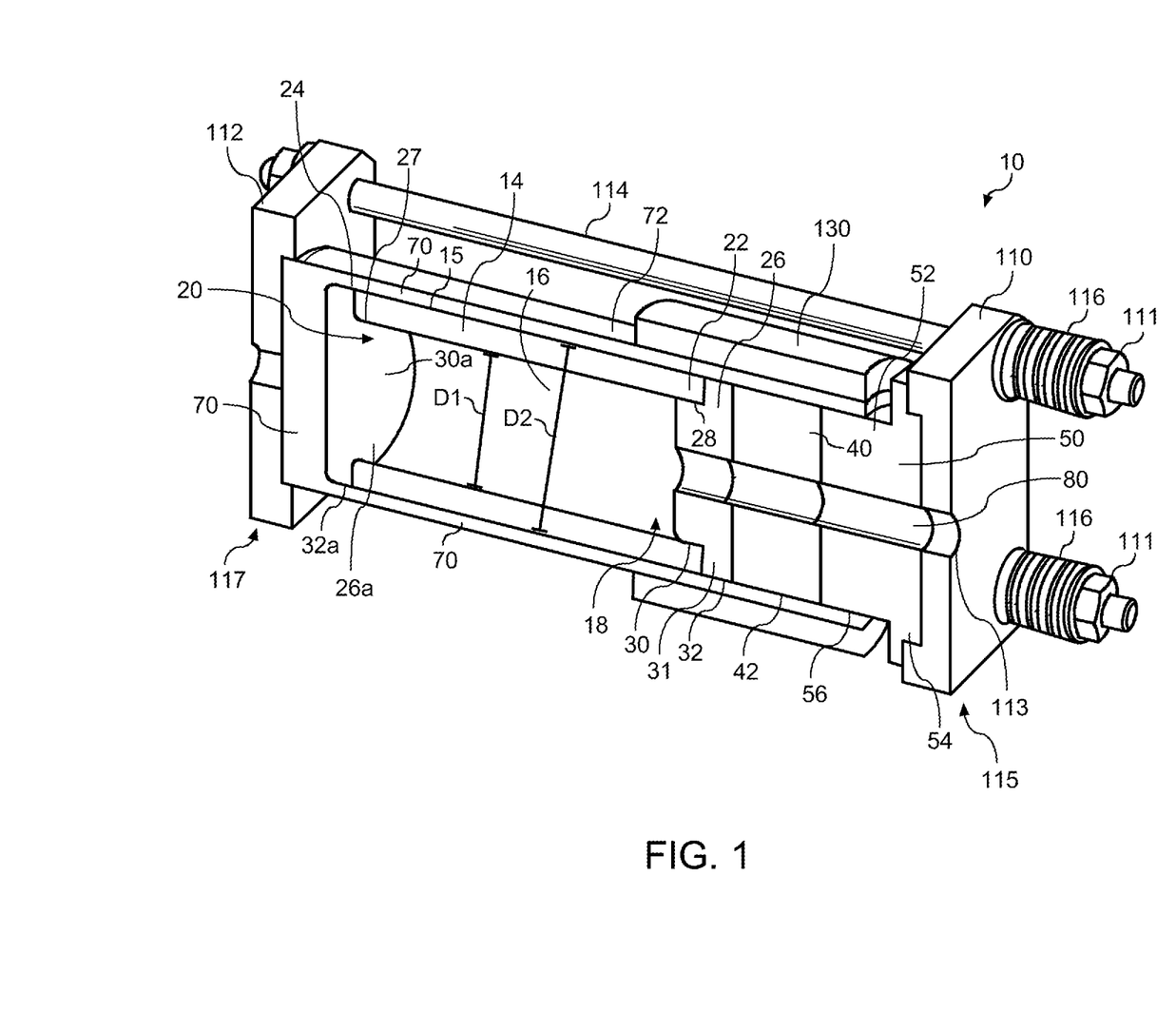
FIG. 1 illustrates a cross sectional view of a pressure vessel in accordance with various aspects of the present disclosure.
Figure 2:
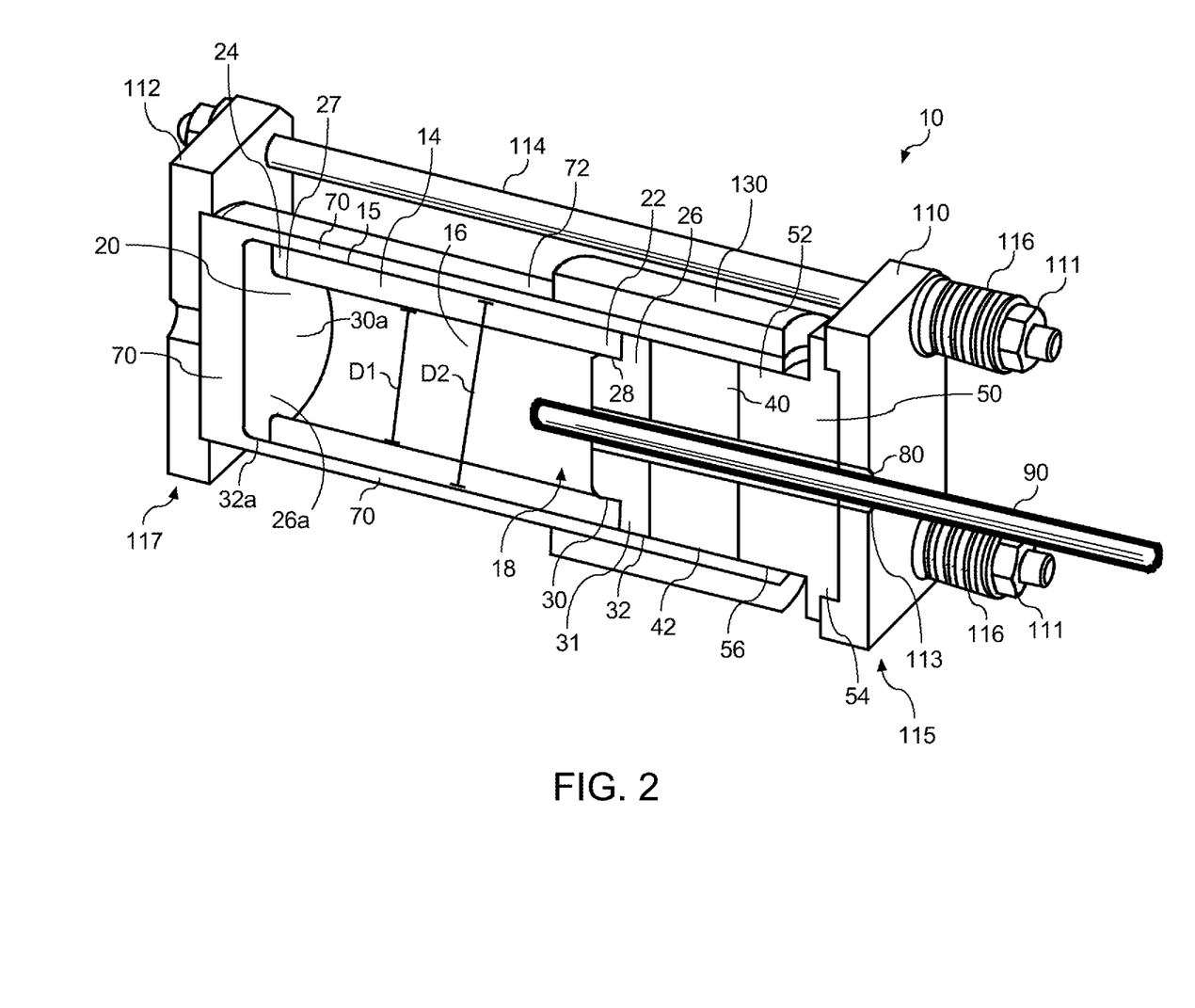
FIG. 2 illustrates a cross sectional view of a pressure vessel having a cable disposed therein in accordance with various aspects of the present disclosure.

Referring now FIGS. 1-2, a pressure vessel 10 is illustrated in accordance with various aspects of the present disclosure. In some examples, the pressure vessel 10 as described may be implemented with cables 90 and are designed to protect the contents of the pressure vessel in deep sea environments. The pressure vessel 10 includes a housing 14. The housing 14 has an internal cavity 16 configured to receive one or more cables 90. The housing 14 can have a cylindrical configuration having one or more openings configured to provide access to the internal cavity 16. For instance, a first opening 18 can be disposed about a first end 22 of the housing 14 and a second opening 20 can be disposed about a second end 24 of the housing 14. The housing also defines a housing outer surface 15. The housing 14 can be formed from any suitable materials including metal materials. Metal materials can include elemental metals or metal alloys. In certain embodiments, the housing 14 is formed from aluminum, aluminum alloys, steel alloys, or combinations thereof.

A plug 26 is disposed in a plug region 28 disposed near the first opening 18. As shown, the plug 26 can include an internal region 30 configured to fit within the inner diameter (D1) of the housing 14 and an outer region 31 having a plug circumferential surface 32. In embodiments, the plug circumferential surface 32 can be the same diameter as the outer diameter (D2) of the housing 14. The plug circumferential surface 32 can be cylindrical and concentric with and of the same diameter as the outer diameter (D2) of the housing 14. The plug 26 can be formed of any suitable material including metal materials. Metal materials can include elemental metals or metal alloys. In certain embodiments, the plug is formed from aluminum, aluminum alloys, steel alloys, or combinations thereof.

A gland seal 40 is disposed adjacent to the plug 26. For instance, the gland seal 40 can be disposed adjacent to an outer surface of the plug 26. The gland seal 40 can also be cylindrical in nature and can further have a gland seal circumferential surface 42. In embodiments, the gland seal circumferential surface 42 can have a diameter that is the same as the outer diameter (D2) of the housing 14. In embodiments, the gland seal circumferential surface 42 can have substantially the same diameter as the inner diameter of the casing 70. The gland seal circumferential surface 42 can be cylindrical and concentric with and of the same diameter as the outer diameter (D2) of the housing 14.

The gland seal can be formed from an elastic material. For instance, in embodiments, the gland seal 40 can be formed from a rubber material. The "rubber material" can comprise any material that is considered by persons skilled in the art to be a "rubber", preferably a crosslinkable rubber (i.e., prior to vulcanization) or crosslinked rubber (i.e., after vulcanization). The rubber component may comprise one rubber or may comprise blends of two or more rubbers, where the rubbers are different in composition or are the same in composition but have different properties.

Non-limiting examples of rubbers include olefin-containing rubbers, butyl rubber, natural rubber, styrene-butadiene copolymer rubber, butadiene rubber, acrylonitrile rubber, halogenated rubbers such as brominated and chlorinated isobutylene-isoprene copolymer rubber, butadiene-styrene-vinyl pyridine rubber, urethane rubber, polyisoprene rubber, epichlorohydrin terpolymer rubber, polychloroprene rubber, and mixtures thereof.

In embodiments, the rubber comprises an ethylene-a-olefin-diene rubber. The ethylene-a-olefin-diene rubber may contain an α-olefin having 3 to 8 carbon atoms. In preferred embodiments the α-olefin is propylene, and the rubber is an ethylene-propylene-diene rubber ("EPDM"). Preferably the diene in the ethylene-a-olefin-diene rubber is a nonconjugated diene. Suitable non-conjugated dienes include 5-ethylidene-2-norbornene ("ENB"); 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene ("DCPD"); 5-vinyl-2-norbornene ("VNB"); divinyl benzene; or combinations thereof. In some embodiments, the ethylene-a-olefin-diene rubber comprises diene-derived units derived from ENB, VNB, or combinations thereof. In preferred embodiments, the ethylene-a-olefin diene rubber consists essentially of, or consists only of, units derived from ethylene, propylene, and ENB. The rubber can also be a hard rubber material.

In other embodiments, the gland seal 40 can be formed from a hyperelastic material, such as a hyperelastic rubber. As used herein "hyperelastic" refers to a material that is a polymer and has a Poisson's ratio greater than 0.45, elongates to over 100% tensile strain before failure, and has a Shore A hardness of less than 100. The hyperelastic material can exhibit primarily an elastic or viscoelastic deformation rather than a plastic deformation A piston 50 is disposed adjacent to the gland seal 40. The piston 50 is configured to exert force on the gland seal 40 causing the gland seal 40 to expand to seal the first end 22 of the housing 14. The piston 50 can include an inner portion 52 and an outer portion 54. The inner portion 52 of the piston 50 can have a diameter that is the same as the outer diameter (D2) of the housing 14. The inner portion 52 of the piston 50 can further define a piston circumferential surface 56. The piston circumferential surface 56 can be cylindrical and concentric with and of the same diameter as the outer diameter (D2) of the housing 14. The piston 50 can be formed of any suitable material including metal materials. Metal materials can include elemental metals or metal alloys. In certain embodiments, the piston 50 can be formed from a material that is corrosion resistant in seawater. Suitable corrosion resistant materials include titanium, titanium alloys, nickel, nickel alloys, corrosion resistant steels, or combinations thereof.

The plug circumferential surface 32, the gland seal circumferential surface 42, and the piston circumferential surface 56 can all have the same diameter as the outer diameter (D2) of the housing 14.

A casing 70 is disposed over the housing outer surface 15, the plug circumferential surface 32, the gland seal circumferential surface 42, and a least a portion of the piston circumferential surface 56. In embodiments, the casing 70 is disposed over the entire housing outer surface 15, the entire plug circumferential surface 32, and the entire gland seal circumferential surface 42, while the casing 70 does not cover the entire piston circumferential surface 56. Further, in embodiments, the casing does not cover other surfaces or components of the pressure vessel 10, other than those as disclosed herein.

The casing 70 can be formed from any material that is inert in seawater. In embodiments, the casing 70 is formed from a thermoplastic material. The thermoplastic material can include at least one olefinic thermoplastic resin. The "olefinic thermoplastic resin" may be any material that is not a "rubber" as described herein. For example, the thermoplastic resin may be a polymer or polymer blend considered by persons skilled in the art as being thermoplastic in nature, e.g., a polymer that softens when exposed to heat and returns to its original condition when cooled to room temperature. The olefinic thermoplastic resin component may contain one or more poly olefins, including poly olefin homopolymers and polyolefin copolymers. In embodiments, the thermoplastic material can be cross-linked or non-crosslinked.

Example thermoplastic resins may be prepared from mono-olefin monomers including, but not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof, and copolymers thereof.

In embodiments, the olefinic thermoplastic resin includes polyethylene. The term "polyethylene" as used herein broadly means any polymer that is considered a "polyethylene" by persons skilled in the art and includes homo, impact, and random copolymers of ethylene. The polyethylene can include low density polyethylene, linear low density polyethylene, high density polyethylene, linear high density polyethylene, or combinations thereof.

The casing 70 can also be formed from a variety of thermoset materials, including thermosetting polymers. As compared to thermoplastic polymers, thermosetting polymers are polymers that can be irreversibly cured (e.g., hardened) by a suitable curing process. Non-limiting examples of thermoset materials include acrylic resins, polyesters, vinyl esters, epoxy-functionalized resins, polyurethanes, and combinations thereof.

The casing 70 can include a thickness that may vary depending on the particular operation and application for the pressure vessel. However, in embodiments, the casing 70 can have a thickness ranging from about 0.1 inches to about 1.5 inches, such as from about 0.2 inches to about 1.3 inches, such as from about 0.25 inches to about 1 inch. The casing 70 can include a material that is continuous and is generally non-porous. For instance, the casing 70 includes a material that prevents fluids (e.g., seawater) from penetrating through the casing 70. The casing material can be comprised of an electrically insulating material if electrical isolation of the housing and internal contents is desired.

An aperture 80 is disposed in the plug 26, the gland seal 40, and the piston 50. The aperture 80 is configured such that at least a portion of the cable 90 can be disposed within the internal cavity 16 of the housing 14. The aperture 80 can be configured with any diameter suitable for disposing a cable 90 therethrough. For instance, in certain embodiments, the diameter of the aperture 80 is only slightly larger than the diameter of the desired cable 90. For instance, the diameter of the aperture 80 can be about 0.5% to about 5%, such as about 1% to about 4%, such as about 2% to about 3% larger than the diameter of the cable 90. In embodiments, it is further contemplated additional apertures 80 can be disposed in the plug 26, gland seal 40, and the piston 50, such that one or more, such as a plurality of cables 90 can be disposed within the internal cavity 16 of the housing 14. (Not shown).

To secure the pressure vessel, a first plate 110 is disposed adjacent to the piston 50 and a second plate 112 is disposed generally about the second end 117 of the pressure vessel 10. The plates 110,112 can include one or more apertures 113 configured to receive the cable 90. The one or more apertures 113 in the plates 110,112 can be configured to axially align with the central axis of the aperture 80 running through the plug 26, the gland seal 40, and the piston 50. The first plate 110 and second plate 112 are coupled via one or more rods 114. In embodiments, the pressure vessel 10 includes at least one rod, such as at least two rods, such as at least three rods, such as at least four rods, (etc.). Each end of the rods 114 can be disposed through an aperture in the first plate 110 and the second plate 112, such that at least a portion of the end of each rod 114 extends from an outer surface of the first plate 110 and the second plate 112. Each end can then be secure via one or more fasteners 111. For instance, each end extending from the first plate 110 and/or second plate 112 can be secured via a nut that is threaded on to the end of the rod 114.

In embodiments, the ends extending from the rods 114 can include a tightening mechanism 116. For instance, the tightening mechanism 116 can include one or more springs disposed around the perimeter of the end of the rod 114 extending from the first plate 110. A fastener 111, such as a nut, can then be threaded on to the end of the rod 114 in order to secure the rod 114. In embodiments, the tightening mechanism 116 can include one or more springs disposed around the rod 114 extending from the first plate 110 and/or the second plate to the fastener 111. Notably, tightening of the fastener and tightening mechanism 116 moves the first plate 110 closer to the piston 50, which exerts force on the gland seal 40 causing the gland seal 40 to expand and seal the first end 115 of the pressure vessel 10. For instance, the plates 110 and 112 can move closer together pushing the piston 50 into the gland seal 40, thus causing the gland seal 40 to expand and seal the first end 115 of the pressure vessel 10.

Expansion of the gland seal 40 can exert pressure on the casing 70 causing the casing to push outward from the center axis of the pressure vessel 10. As such, one or more constraint rings 130 can be positioned on a portion of the outer surface 72 of the casing 70. The constraint ring 130 can be configured to hold the casing 70 in place against the gland pressure. Thus, in embodiments, the constraint ring 130 is located on an outer surface of the casing 70 located externally from the gland seal 40. The constraint ring 130 can be formed from any suitable material including metal materials. For instance, the constraint ring 130 can be formed from a material that is corrosion resistant in seawater. Suitable corrosion resistant materials include titanium, titanium alloys, nickel, nickel alloys, corrosion resistant steels, and combinations thereof.

Figure 3:
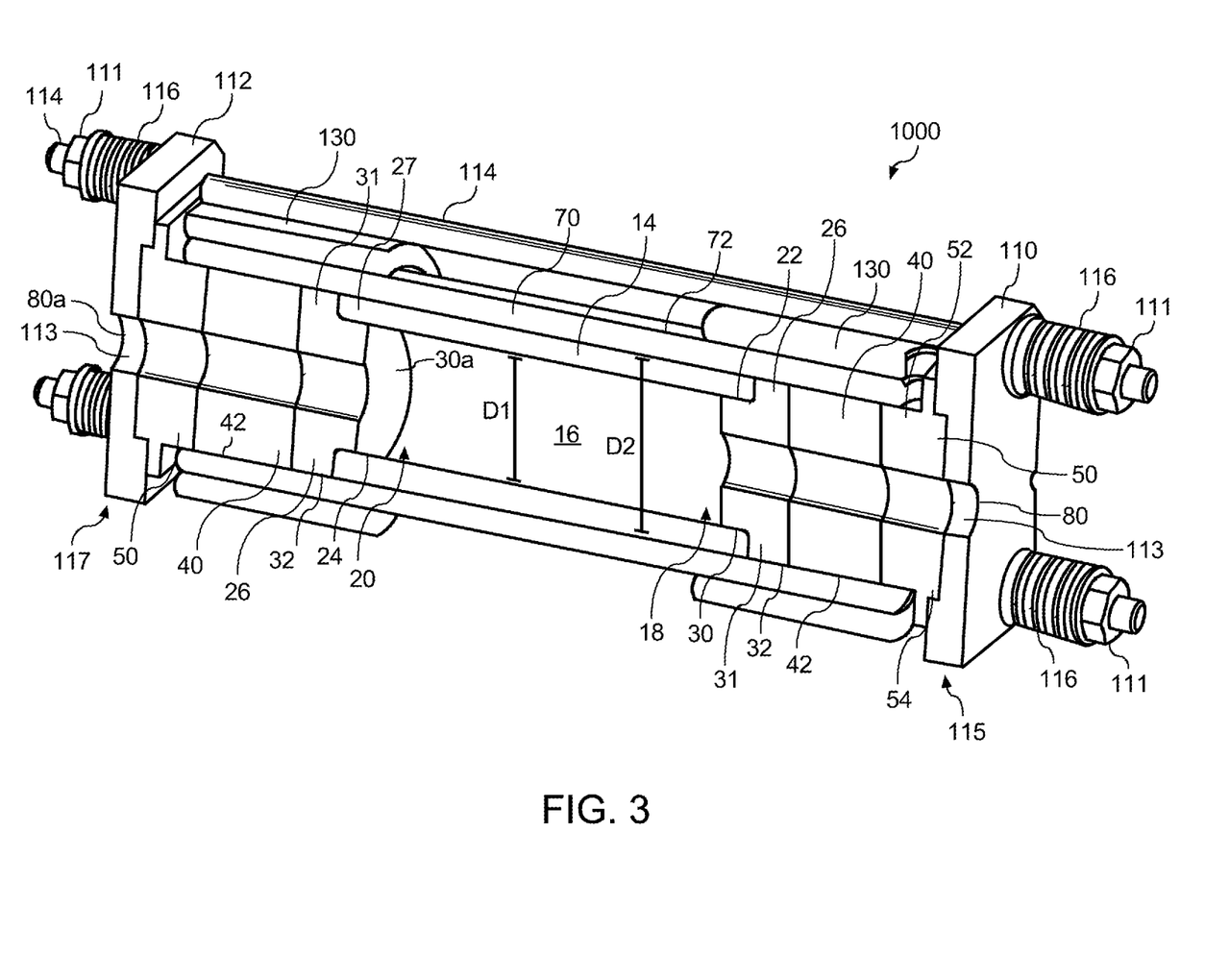
FIG. 3 illustrates a cross sectional view of a pressure vessel in accordance with various aspects of the present disclosure.

As shown in FIGS. 1-3, plug 26a can be disposed in a second plug region 27 generally disposed in the second end 117 of the pressure vessel 10. As shown, the plug 26a can include an internal region 30a configured to fit within the inner diameter (D1) of the housing 14 and an outer region 31a having a plug circumferential surface 32a. In embodiments, the plug circumferential surface 32a can be the same diameter as the outer diameter (D2) of the housing 14. The plug circumferential surface 32a can be cylindrical and concentric with and of the same diameter as the outer diameter (D2) of the housing 14. The plug 26a can be formed of any suitable material including metal materials. Metal materials can include elemental metals or metal alloys. In certain embodiments, the plug is formed from aluminum, aluminum alloys, steel alloys, or combinations thereof.

In such an embodiment, the casing 70 covers the plug 26a and is disposed between the plug 26a and the second plate 112. In embodiments, the casing 70 can be formed from a single piece or two separate pieces that can be welded together. For instance, the portion of the casing 70 encasing the housing 14 can be formed from a first portion and a portion of the casing 70 enclosing the plug 26a can be formed from a separate second portion. The two portions of casing 70 can then be coupled together, for instance, via a weld joint.

Figure 4:
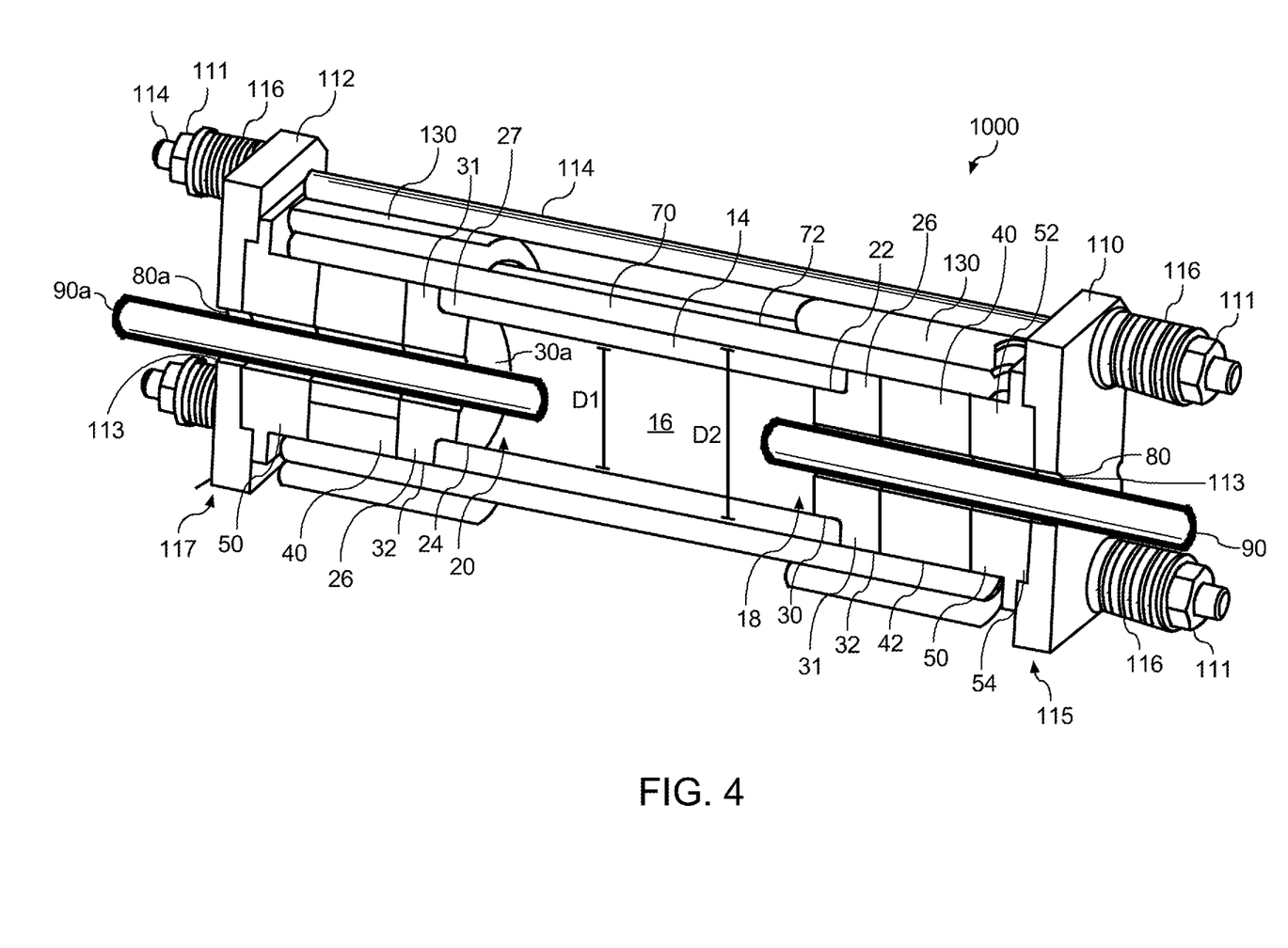
FIG. 4 illustrates a cross sectional view of a pressure vessel having a cable disposed therein in accordance with various aspects of the present disclosure.

Referring now FIGS. 3-4, a pressure vessel 1000 is illustrated in accordance with various aspects of the present disclosure. In some embodiments, the pressure vessels 1000 as described may be implemented with cables 90 and are designed to protect the contents of the pressure vessel in deep sea environments. The pressure vessel 1000 includes a housing 14. The housing 14 has an internal cavity 16 configured to receive one or more cables 90. The housing 14 can have a cylindrical configuration having one or more openings configured to provide access to the internal cavity 16. For instance, a first opening 18 can be disposed about a first end 22 of the housing 14 and a second opening 20 can be disposed about a second end 24 of the housing 14. The housing also defines a housing outer surface 15. The housing 14 can be formed from any suitable materials including metal materials. Metal materials can include elemental metals or metal alloys. In certain embodiments, the housing 14 is formed from aluminum, aluminum alloys, steel alloys, or combinations thereof.

In both the first end 115 and the second end 116 of the pressure vessel 1000, plugs 26 are disposed in a first plug region 28 disposed near the first opening and a second plug region 27 disposed near the second opening 20. As shown, each of the plugs 26 can include an internal region 30 configured to fit within the inner diameter (D1) of the housing 14 and an outer region having a plug circumferential surface 32. In embodiments, the plug circumferential surface 32 can be the same diameter as the outer diameter (D2) of the housing 14. The plug circumferential surface 32 can be cylindrical and concentric with and of the same diameter as the outer diameter (D2) of the housing 14. The plug 26 can be formed of any suitable material including metal materials. Metal materials can include elemental metals or metal alloys. In certain embodiments, the plug is formed from aluminum, aluminum alloys, steel alloys, or combinations thereof.

A gland seal 40 is disposed adjacent to each plug 26. For instance, the gland seal 40 can be disposed adjacent to an outer surface of the plug 26. The gland seal 40 can also be cylindrical in nature and can have a gland seal circumferential surface 42. In embodiments, the gland seal circumferential surface 42 can have a diameter that is the same as the outer diameter (D2) of the housing 14. The gland seal circumferential surface 42 can be cylindrical and concentric with and of the same diameter as the outer diameter (D2) of the housing 14. The gland seal 40 can be formed from an elastic material. For instance, in embodiments, the gland seal 40 can be formed from a rubber material and/or a hyper elastic material. The rubber material can include any material described hereinabove with respect to FIGS. 1-2.

Pistons 50 are further disposed adjacent to each gland seal 40 in both the first end 115 and the second end 117 of the pressure vessel 1000. The piston 50 is configured to exert force on the gland seal 40 causing the gland seal 40 to expand to seal the first end 22 of the housing 14 and/or the second end 24 of the housing 14. The piston 50 can include an inner portion 52 and an outer portion 54. The inner portion 52 of the piston 50 can have a diameter that is the same as the outer diameter (D2) of the housing 14. The inner portion 52 of the piston 50 can further define a piston circumferential surface 56. The piston circumferential surface 56 can be cylindrical and concentric with and of the same diameter as the outer diameter (D2) of the housing 14. The piston 50 can be formed of any suitable material including metal materials. Metal materials can include elemental metals or metal alloys. In certain embodiments, the piston 50 is formed from a material that is corrosion resistant in seawater. In certain embodiments, the piston 50 is formed from titanium, titanium alloys, nickel, nickel alloys, corrosion resistant steels, and combinations thereof.

Notably, the plug circumferential surface 32, the gland seal circumferential surface 42, and the piston circumferential surface 56 can all have the same diameter as the outer diameter (D2) of the housing 14.

A casing 70 is disposed over the housing outer surface 15, each of the plug circumferential surfaces 32, each of the gland seal circumferential surfaces 42, and a least a portion of each of the piston circumferential surfaces 56. In embodiments, the casing 70 is disposed over the entire housing outer surface 15, each of the entire plug circumferential surfaces 32, and each of the entire gland seal circumferential surfaces 42, while the casing 70 does not cover each of the entire piston circumferential surfaces 56. Further, in embodiments, the casing 70 does not cover other surfaces or components of the pressure vessel 10, other than those as disclosed herein. For instance, in embodiments the casing 70 does not cover, the first plate 110, second plate 112, rods 114, tightening mechanism 116, fasteners 111, or constraint rings 130. The casing 70 can be formed from any material that is corrosion resistant in seawater. Suitable materials include thermoplastic materials or thermoset materials as described hereinabove with reference to FIGS. 1-2.

Along the first end 115, an aperture 80 is disposed in the plug 26, the gland seal 40, and the piston 50. The aperture 80 is configured such that at least a portion of the cable 90 can be disposed within the internal cavity 16 of the housing 14. Further, along the second end 117 of the pressure vessel 1000, a second aperture 80 is disposed in the second plug 26, the second gland seal 40, and the second piston 50. The aperture disposed in the second end 117 is configured to allow for a cable 90 to be disposed within the inner cavity 16 of the housing 14 along the second end 117. Thus, in such an embodiment, one or more cables 90 can be introduced into the internal cavity 16 of the housing 14 via the first end 115 or the second end 117. Further, in embodiments a single cable can run from the first end 115, through the internal cavity 16 of the housing 14 and out of the second end 117 of the pressure vessel 1000. (Not shown). For instance, such an embodiment can be utilized to repair or to join sections of cable for repair in an underwater environment. Thus, in such an embodiment, the pressure vessel 100 can be configured to house one or more cables 90 and to effectively seal one or more cables 90 via the first end 115 and the second end 117 of the pressure vessel 1000.

To secure the pressure vessel 1000, a first plate 110 is disposed adjacent to the piston 50 about the first end 115 and a second plate 112 is disposed adjacent to a piston 50 about the second end 117 of the pressure vessel 10. The plates 110,112 can include one or more apertures 113 configured to receive one or more cables 90. The apertures 113 in the plates 110,112 can be configured to axially align with the central axis of the aperture 80 running through the plug 26, the gland seal 40, and the piston 50. The first plate 110 and second plate 112 are coupled via one or more rods 114. For instance, in embodiments, the pressure vessel 1000 includes at least one rod, such as at least two rods, such as at least three rods, such as at least four rods, (etc.). Each end of the rods 114 can be disposed through an aperture in the first plate 110 and the second plate 112, such that at least a portion of the end of each rod 114 extends from an outer surface of the first plate 110 and the second plate 112. Each end can then be secure via one or more fasteners 111. For instance, each end extending from the second plate 112 can be secured via a nut that is threaded on to the end of the rod 114.

In embodiments, ends extending from the rods 114 from either the first plate 110 or the second plate 112 can include a tightening mechanism 116. For instance, the tightening mechanism 116 can include one or more springs disposed around the perimeter of the end of the rod 114 extending from the first plate 110 and/or the second plate 112. A fastener 111, such as a nut, can then be threaded on to the end of the rod 114 to secure the rod 114. In embodiments, the tightening mechanism 116 can include one or more springs disposed around the rod 114 extending from the first plate 110 and/or the second plate 112 to the fastener 111. Notably, tightening of the fastener 11 and the tightening mechanism 116 moves the first plate 110 and/or the second plate 112 closer to the piston 50, which exerts force on the gland seal 40 causing the gland seal 40 to expand and seal the first end 115 and/or the second end 117 of the pressure vessel 1000. For instance, the plates 110 and 112 can move closer together pushing each piston 50 into each gland seal 40, thus causing each of the gland seals 40 to expand and seal the first end 115 and the second end 117 of the pressure vessel 1000.

Expansion of each gland seal 40 can exert pressure on the casing 70 causing the casing to push outward from the center axis of the pressure vessel 10. As such, one or more constraint rings 130 can be positioned on a portion of the outer surface 72 of the casing 70. The constraint rings 130 can help hold the casing 70 in place during use of the pressure vessel 1000 in external hydrostatic pressure environments. The constraint rings 130 can be formed from any suitable material. For instance, the constraint rings 130 can be formed from a material that is corrosion resistant in seawater. Suitable corrosion resistant materials include titanium, titanium alloys, nickel, nickel alloys, corrosion resistant steels, and combinations thereof.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A pressure vessel comprising:
    a housing capable of withstanding external hydrostatic pressures having an internal cavity defining a first opening permitting access to the internal cavity and a housing outer surface;
    a plug disposed in a plug region near the first opening, the plug having a plug circumferential surface;
    a gland seal disposed adjacent to the plug, the gland seal having a gland seal circumferential surface;
    a piston disposed adjacent to the gland seal, the piston having a piston circumferential surface;

a first plate and second plate connected via one or more rods configured to exert force against the gland seal such that expansion of the gland seal effectively seals the first opening of pressure vessel; and a casing disposed over the housing outer surface, the plug circumferential surface, the gland circumferential surface, and at least a portion of the piston circumferential surface.

2. The pressure vessel of claim 1, wherein the housing comprises a cylindrical configuration having an outer diameter, and the plug circumferential surface, the gland seal circumferential surface, and the piston circumferential surface are cylindrical and concentric with and of the same diameter as outer diameter of the housing.

3. The pressure vessel of claim 1, comprising one or more constraint rings disposed on at least a portion of an outer surface of the casing external from the gland seal.

4. The pressure vessel of claim 1, comprising a tightening mechanism including one or more springs disposed between the plate and an end of the rod, such that compressing the spring moves the plate towards the piston to exert force on the gland seal.

5. The pressure vessel of claim 1, wherein the plug, the gland seal, and the piston each comprise an aperture configured to house a cable such that at least a portion of the cable is disposed in the internal cavity.

6. The pressure vessel of claim 5, wherein the gland seal is configured to seal between the cable and the gland seal when pressure is exerted on the gland seal, such that the internal cavity is sealed from an external environment.

7. The pressure vessel of claim 1, wherein the gland seal is formed from an elastomeric material.

8. The pressure vessel of claim 1, wherein the gland seal is formed from an ethylene propylene diene monomer rubber.

9. The pressure vessel of claim 1, wherein the gland seal is formed from a hyper elastomeric material.

10. The pressure vessel of claim 1, wherein the housing is formed from a metal material.

11. The pressure vessel of claim 10, wherein the housing is formed from aluminum or steel.

12. The pressure vessel of claim 1, wherein the casing is formed from a material that is corrosion resistant in sea water.

13. The pressure vessel of claim 12, wherein the casing is formed from a thermoplastic material.

14. The pressure vessel of claim 13, wherein the casing is formed from low density polyethylene, very low density polyethylene, high density polyethylene, very high density polyethylene, or combinations thereof.

15. The pressure vessel of claim 1, wherein the plug is formed from aluminum.

16. The pressure vessel of claim 1, wherein the housing comprises a second opening having a second plug disposed in a second plug region near the second opening, the second plug having a second plug circumferential surface, a second gland seal disposed adjacent to the second plug, the second gland seal having a second gland seal circumferential surface, a second piston disposed adjacent to the second gland seal, the second piston having a second piston circumferential surface, wherein the casing is disposed over the second plug circumferential surface, the second gland seal circumferential surface, and at least a portion of the second piston circumferential surface.

17. The pressure vessel of claim 16, wherein the second plug, the second gland seal, and the second piston comprise a second aperture configured to house a cable such that at least a portion of the cable is disposed in the internal cavity.

18. The pressure vessel of claim 17, wherein the second gland seal is configured to seal between the cable and the second gland seal when pressure is exerted on the second gland seal, such that the internal cavity is sealed from an external environment.

19. The pressure vessel of claim 1, wherein the housing comprises a second opening having a second plug disposed in a second plug region near the second opening, wherein the casing covers the second plug and is coupled to an inner surface of the second plate.

20. A method for providing a sealed environment, comprising:

disposing at least a portion of one or more cables into a pressure vessel, the pressure vessel comprising:

a housing capable of withstanding external hydrostatic pressures having an internal cavity defining a first opening through which the one or more cables can be disposed in the internal cavity, the housing also having a housing outer surface;

a plug disposed in a plug region near the first opening, the plug having a plug circumferential surface;

a gland seal disposed adjacent to the plug, the gland seal having a gland seal circumferential surface;

a piston disposed adjacent to the gland seal, the piston having a piston circumferential surface;

a first plate and second plate disposed adjacent to the piston, wherein the first plate and second plate are connected via one or more rods; and a casing disposed over the housing outer surface, the plug circumferential surface, the gland circumferential surface, and at least a portion of the piston circumferential surface; and applying force on the gland seal to expand the gland seal and seal the first opening of the pressure vessel.

* * * * *